(12) United States Patent
Ishii et al.

(10) Patent No.: US 7,424,475 B2
(45) Date of Patent: Sep. 9, 2008

(54) EMERGENCY ACCESS INTERCEPTION ACCORDING TO BLACK LIST

(75) Inventors: Yohsuke Ishii, Yokohama (JP); Koji Sonoda, Sagamihara (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 174 days.

(21) Appl. No.: 10/786,072

(22) Filed: Feb. 26, 2004

(65) Prior Publication Data

US 2005/0108257 A1  May 19, 2005

(30) Foreign Application Priority Data

Nov. 19, 2003 (JP) ............... 2003-389230

(51) Int. Cl.
*G06F 7/00* (2006.01)
*G06F 17/30* (2006.01)

(52) U.S. Cl. ................ 707/9; 707/1; 707/10

(58) Field of Classification Search ........... 709/229, 709/225, 218, 104, 223; 455/410; 707/9, 707/1, 10; 718/104; 340/5.28
See application file for complete search history.

(56) References Cited

U.S. PATENT DOCUMENTS

| | | | | |
|---|---|---|---|---|
| 5,260,551 | A * | 11/1993 | Wiik et al. | 340/5.28 |
| 6,523,117 | B2 * | 2/2003 | Oki et al. | 713/189 |
| 6,772,350 | B1 | 8/2004 | Belani et al. | |
| 7,007,093 | B2 * | 2/2006 | Spicer et al. | 709/229 |
| 2002/0053029 | A1 | 5/2002 | Nakamura et al. | |
| 2002/0138727 | A1 | 9/2002 | Dutta et al. | |
| 2002/0184360 | A1 * | 12/2002 | Weber et al. | 709/223 |
| 2003/0018747 | A1 * | 1/2003 | Herland et al. | 709/218 |
| 2003/0028798 | A1 | 2/2003 | Burnett | |
| 2003/0041088 | A1 * | 2/2003 | Wilson et al. | 709/104 |
| 2004/0044529 | A1 * | 3/2004 | Murakami | 704/251 |
| 2004/0127190 | A1 | 7/2004 | Hanson et al. | |
| 2004/0153552 | A1 * | 8/2004 | Trossen et al. | 709/229 |
| 2004/0203589 | A1 * | 10/2004 | Wang et al. | 455/410 |
| 2004/0221037 | A1 * | 11/2004 | Costa-Requena et al. | 709/225 |

(Continued)

FOREIGN PATENT DOCUMENTS

JP       11-282805       10/1999

OTHER PUBLICATIONS

Internet X.509 Public Key Infrastructure Certificate and CRL Profile.

*Primary Examiner*—Don Wong
*Assistant Examiner*—Patrick A Darno
(74) *Attorney, Agent, or Firm*—Mattingly, Stanger, Malur & Brundidge, P.C.

(57) ABSTRACT

This invention addresses to execute an emergency access interception in a widely distributed environment.

An access controller 100 manages an access control list (ACL) 110 recording access right to each object, and a black list (BL) 120 recording user information corresponding to the emergency access interception. The access controller 100 receives a request for authentication to access right and judges whether or not the access right is proper, first according to the BL 120 then ACL110. In case where the user information corresponding to the request is recorded in the BL 120, the access controller 100 sends out the user information to other access controllers and instructs them to register it in the black list. This invention effectively actualizes the emergency access interception under the widely distributed environment in case where the interception is required for any user.

5 Claims, 10 Drawing Sheets

U.S. PATENT DOCUMENTS

2004/0254934 A1* 12/2004 Ho et al. .................. 707/9
2005/0065935 A1* 3/2005 Chebolu et al. ............. 707/9
2005/0091658 A1* 4/2005 Kavalam et al. ............ 718/104
2005/0110609 A1* 5/2005 Mosgrove et al. .......... 340/5.72

* cited by examiner

Fig.3A          110

| ID | Object | User | Group | Permission |
|----|--------|------|-------|------------|
| 1  | O-1    | S-3  | -     | R,W        |
| 2  | O-1    | -    | G-1   | R          |
| 3  | O-2    | S-7  | -     | R,W        |
| 4  | O-2    | -    | G-2   | R          |
| 5  | O-3    | S-1  | -     | R,W        |
| 6  | O-3    | -    | G-2   | R          |

R-Read
W-Write

120

| User ID | User Name    |
|---------|--------------|
| S-1     | Taro Hitachi |

EMERGENCY ACCESS INTERCEPTION ACCORDING TO BLACK LIST

BACKGROUND OF THE INVENTION

1. Field of the Invention

This invention relates to an access control to information resources stored in a computer.

2. Description of the Related Art

Access control lists (ACLs) record permitted users for information resources stored in computers and are referred to restrict accesses by improper users, thereby enhancing securities for the information resources. Recently, a widely distributed environment, in which a plurality of networks are connected through a wide area network, such as the Internet, and enables the information resources including data files to be shared among the networks, is utilized. The ACL is also effective under the environment to enhance the securities. Under the environment, the ACLs, each of them being managed by each access controller connected with each network, are synchronized among all access controllers.

Since access right or permission to information resources are not stable but flexible, some cases require an interception of all accesses by a specific user under the widely distributed environment. JP 1999-282805A discloses a technique that synchronizes update of all ACLs in such a case where the access right of the specific user has to be prohibited, thereby intercepting all accesses by the prohibited user. Another technique periodically transmits a certification issued by a certificate authority for the access right, thereby intercepting accesses by users with invalid certifications.

But these conventional technique are not effective enough for emergency access interception in the following exemplified cases: a prohibition of access right after dismissing a specific user and detection of improper access. That is because the first technique requires long time to update the ACL, and the second technique cannot intercept the access before the new certification is issued and the old one turns to be expired.

The above-mentioned problem is not specific for the widely distributed environment but common to any system in which a plurality of access controllers cooperate together in controlling accesses to information resources.

SUMMARY OF THE INVENTION

To solve at least a part of the above-mentioned problem, this invention is directed to a first embodiment as follows. The first embodiment provides an access controller that controls an access to an information resource stored in a storage device, under an environment where a plurality of the access controllers and the storage devices are connected with a network. The access controller comprises an access restriction module, an access interception module, an input module and a list update module. The access restriction module is configured to restrict access to each information resource according to an access control list (ACL) on which access right to each information resource is recorded. The access interception module is configured to intercept an access by an access prohibited user listed on an access prohibition list. The input module is configured to receive user information of the access prohibited user. The list update module is configured to update the access prohibition list referred by each of the access controllers connected with the network, according to the user information input through the input module.

Various information that can specify the access prohibited user is utilized as the user information, and may include, for example, user ID and a user name. Information to specify user's terminal or computer is also available as the user information. The ACL may contain detailed information of access right, such as "reading only" and "delete prohibited" or simple information, such as "access permitted" and "access prohibited".

The input module may receive the user information in various manners: receiving input of the information directly through user's keyboard operations or the like; reading out the information from data files recording the access prohibited users thereon; and receiving the access prohibition list itself. The list update module may update the access prohibition list through rewriting the user information registered in the list or replacing the access prohibition list itself.

This invention notifies all access controllers connected with the network of the user information for the emergency access interception, thereby enabling required emergency access interception under the widely distributed environment where a plurality of networks are connected each other through a wide area network, such as the Internet. The access prohibition list, which does not record access permission to each file but contains prohibited user information, is smaller than the ACL, which record access right corresponding to each information resource and has a large amount of data size. This smaller data size of the access prohibition list can reduce required time and load to update itself.

In the first embodiment, the list update module may send out an other access controller a registration instruction to register the input user information on the access prohibition list of the other access controller. This application preferably reduces network traffic.

In the first embodiment, the list update module may send out a updated access prohibition list to an other access controller. The other access controller can easily replace the old list with the updated list.

A second embodiment of the invention provides an access controller that controls an access to an information resource stored in a storage device, under an environment where a plurality of the access controllers and the storage devices are connected with a network. The access controller comprises an access restriction module, a receiving module, a list update module and an access interception module. The access restriction module is configured to restrict access to each information resource according to an access control list on which access right to each information resource is recorded. The receiving module is configured to receive user information of an access prohibited user from the other access controller. The list update module is configured to update an access prohibition list, which records user information of access prohibited users, according to the received user information. The access interception module is configured to restrict the access by reference to the access prohibition list prior to the access control list.

In the second embodiment, each of the access controllers can reflect the access prohibited users information added to the access prohibition list of any other access controller to own access prohibition list without delay. Accordingly, the second embodiment effectively actualize the emergency access interception under the widely distributed environment.

Both in the first and second embodiments, the access interception module may also intercept the access that has not been completed. This embodiment can intercept accesses that are started before updating the access prohibition list, accesses after the updating and accesses in waiting for processing, thereby enhancing the securities.

The access controller may further comprises an access control list update module configured to update the ACL according to the access prohibition list. This embodiment can automatically update the ACL to reduce maintenance load for the ACL.

The list update module may delete the user information on the access prohibition list at a predetermined timing.

Keeping the user information which has been once registered on the access prohibition list causes enlarged data size of the access prohibition list and requires longer time to check through the access prohibition list. Deleting the user information registered on the access prohibition list after updating the ACL as described above avoids enlarged size of the access prohibition list and the delay of the access interception process. Deleting the access prohibition list itself is also available.

The predetermined timing may be after the completion of updating the access control list. This allows each access controller connected with each network to individually delete the user information that has been reflected to the ACL. The access controller refers to the access prohibition list prior to the ACL, so that the load for checking the list can be reduced by deleting the user information from the access prohibition list.

The predetermined timing may be after all of the access control lists have been updated.

This embodiment ensures synchronization of access prohibition lists and ACLs among all of the access controllers. This embodiment can be especially effective in case where, for example, the updated access prohibition list is distributed and replaced to old lists as the updating process. This embodiment ensures reflection of the updated access prohibition list to the ACL without lack due to provision of the list which has not been updated in those in some access controllers. Accordingly, the access interception according to the synchronized ACLs free from the above-mentioned lack can be actualized.

This invention may also provide an access control system by means of combination of the first and second embodiments. In the case where the access prohibition list of any one of access controllers is updated according to user information, the access controller sends out the user information or the updated access prohibition list to one or plural other access controllers in response to the update. The other access controller receives the user information or the updated access prohibition list to update own access prohibition list.

Transmitting the user information can reduce the traffic of the network, thereby enhancing the processing efficiency. On the other hand, transmitting the access prohibition list can inform the user information to specify a plurality of users to be subjected to the emergency access interception, and reduce the load for updating the access prohibition list in the receiving access controller by replacing it with the transmitted one.

The distribution module may broadcast the user information or the updated access prohibition list over all of other access controllers. This can make a simultaneous notice to all of the access controllers and ensure a synchronization of access prohibition lists.

The distribution module of each access controller may send out the user information or the updated prohibition list to predetermined another access controller, thereby transmitting the user information or the updated prohibition list from one access controller to another. This can reduce required time for each transmission by reflecting hopping number on the network to selection of the destination access controller.

Various modifications are considerable for this invention out of the access controller and the access control system above, such as an access control method, a computer program to execute such access control, and a computer readable recording medium in which the computer program is recorded or a wave form in which the computer program is transmitted. Various features above are available each of these modifications.

When the present invention is configured as a computer program, a recording medium with such program recorded therein, or the like, such configuration may include an entire program for controlling or only a part that realizes the functions according to the present invention. A variety of computer-readable recording media may be used as the recording medium, including as flexible disk, CD-ROM, DVD-ROM, punched card, print with barcodes or other codes printed thereon, and internal storage device (memory such as ROM and RAM) and external storage device of the computer.

BRIEF DESCRIPTION OF THE DRAWINGS

FIGS. 3A and 3B are schematics that show an exemplar of the access control list.

FIG. 4 is a schematic that shows an exemplar of the black list.

DESCRIPTION OF THE PREFERRED EMBODIMENTS

The embodiments of this invention are described below.

A. Embodiment

A1. System Configuration

Figure 1:
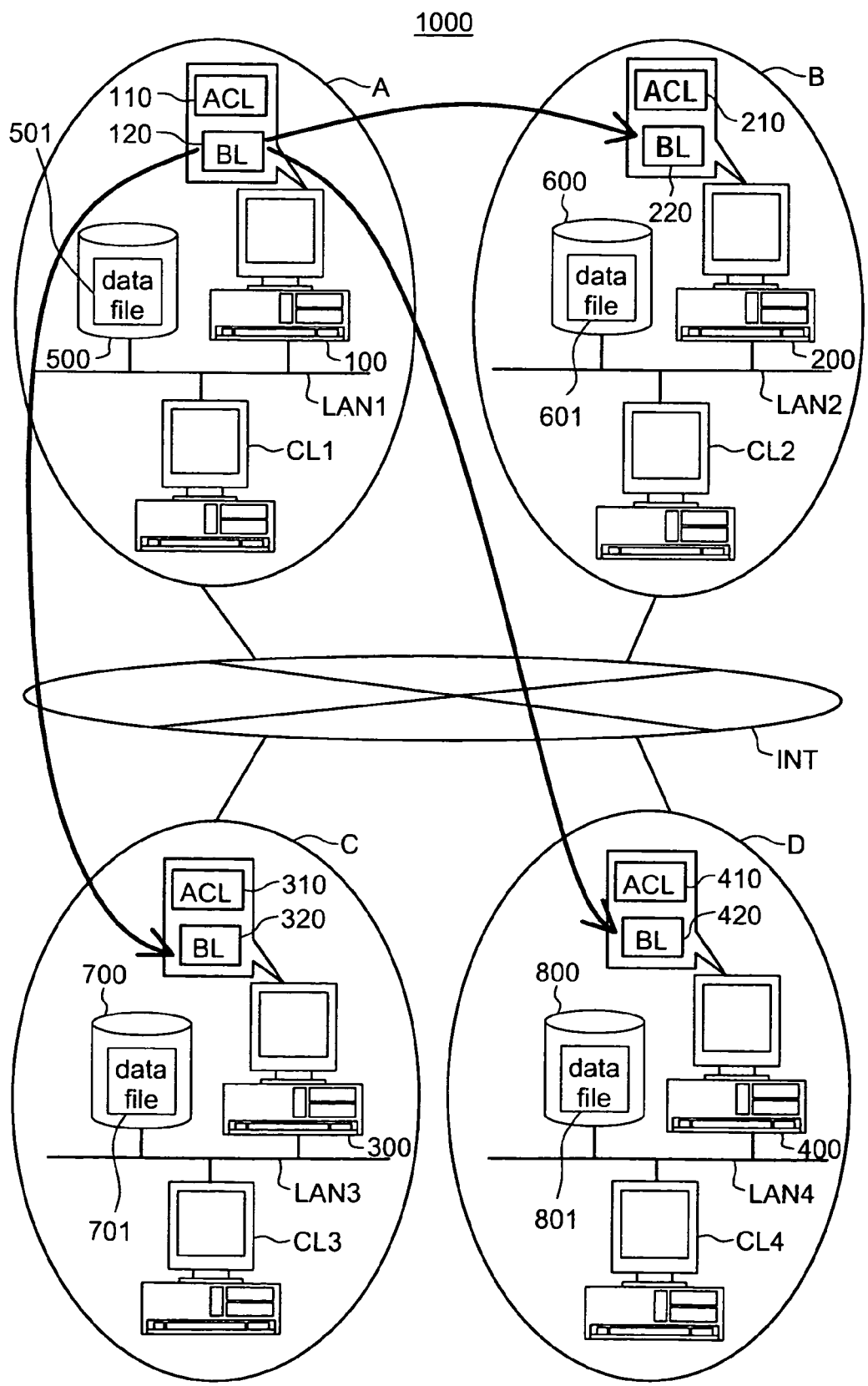
FIG. 1 is a schematic that shows a system configuration of the embodiment.

FIG. 1 is a schematic that shows a system configuration of the embodiment. An access control system 1000 is configured by connecting four networks A, B, C, D via an Internet INT. Connected with the network A via a local area network LAN1 are an access controller 100, a storage device 500, a client CL1 and the like. Similarly, connected with the networks B, C, D via local area networks LAN2, LAN3, LAN4 are access controllers 200, 300, 400, storage devices 600, 700, 800 and clients CL2, CL3, CL4, respectively.

Storage devices store data file 501, 601, 701, 801 and the like, respectively. The access control system 1000 is configured as so-called widely distributed environment via the Internet INT. Each client can access not only to the storage device connected with own network, but also to others connected with other networks, and can read data files stored in these storage devices. For example, the client CL1 can read not only data file 501 in the storage device 500 but also data file 701 in the storage 700 on the network C.

Access right is required to access to every data file in these storage devices. Each access controller judges whether or not the access right is proper to control the access. Concretely, in the case where the client CL1 sends out an access request for the data file 501, the access controller 100 authenticates whether or not the client CL1's user is permitted to access to the data file 501 and controls the access according to the result of the authentication.

The access controller 100 manages two kinds of lists, an access control list 110 (hereinafter referred to as "ACL 110") and an access prohibition list 120 (hereinafter referred to as "black list 120"). The ACL 110 contains the detail access right to each object, such as a data file for each user. The black list 120 contains user information to specify users to be subjected to an emergency access interception. The access controller 100 first checks whether or not the user information of the requesting user is recorded on the black list 120, in response to an access requirement, and subsequently checks the ACL 110 if the user information is not recorded in the black list 120.

In the case where an emergency access interception is required in the network A, for example, the case where any one of users is dismissed, the access controller 100 also updates own black list 120 according to user information that is input through administrator's operation, and instructs other access controllers 200, 300, 400 to register this user information to the black list 220, 320, 420. The access controllers 200, 300, 400 receive this registration instruction and update respective black list 220, 320, 420. This sequence effectively actualizes emergency access interception within all networks under the widely distributed environment.

A2. Functional Blocks

Figure 2:
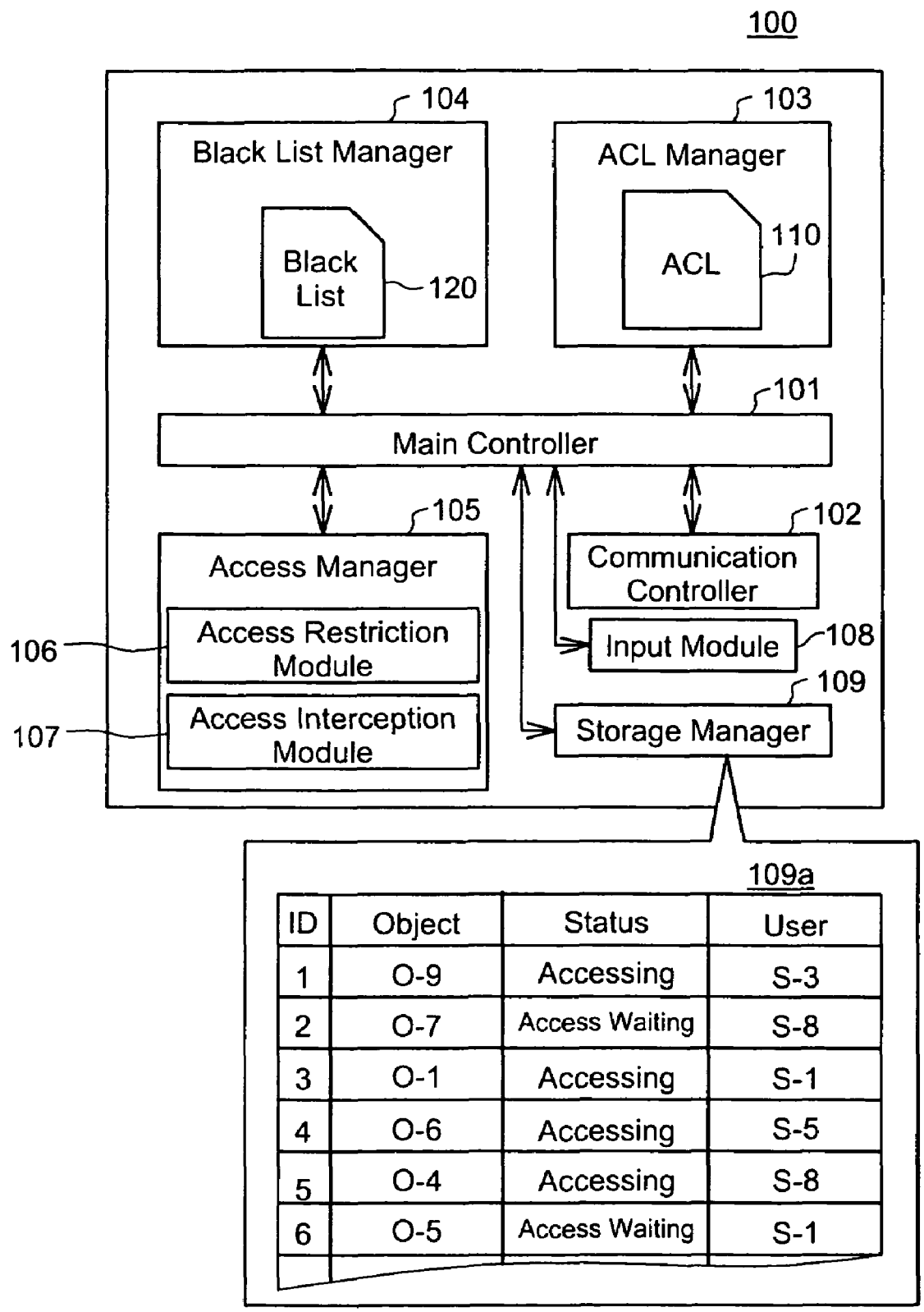
FIG. 2 is a schematic that shows functional blocks in the access controller of the embodiment.

FIG. 2 is a schematic that shows functional blocks in the access controller of the embodiment. The access controller 100 includes a main controller 101, a communication controller 102, an ACL manager 103, a black list manager 104, an access manager 105, an input module 108 and a storage manager 109. The access manager 105 includes an access restriction module 106 and an access interception module 107 therein. The communication controller 102 controls following communications via the network: a communication with other devices in the own local area network LAN1, and a communication with other networks via the Internet INT.

The ACL manager 103 manages the ACL 110. The detail of the ACL 110 is described below. The black list manager 104 manages the black list 120. The user information to be registered includes user ID and user name, which are input by the administrator through the input module 108. The detail of the black list 120 is described below. The ACL manager 103 also updates ACL 110 by reflecting the user information of the black list 120 to the ACL 110. The access controller 100 deletes the user information which has been reflected to the ACL 110 from the black list 120, to ensure the processing efficiency of the access control.

The storage manager 109 manages storage devices in own local area network LAN1, such as storage device 500. The manage is for data in the storage devices and users accessing to each storage device by an access management table 109a illustrated in the figure.

The access management table 109a includes information such as: unique access ID of each access, access required object's name, statuses of access, and accessing user's information. In the illustrated example, the object "O-9" in the access ID [1] is in "Accessing" status by the user "S-3". Similarly, the object "O-7" in the access ID [2] is in "Access Waiting" status by the user "S-8".

The access manager 105 provides a function of access controls, including an access restriction according to the ACL and an emergency access interception. The access restriction module 106, included in the access manager 105, checks the ACL 110 for the authentication of user's access right and responses the result to the storage device 500, in response to an authentication requirement. The access interception module 107, also included in the access manager 105, checks the black list 120 to find the user in formation in the access management table 109a and if found, intercepts any access by the corresponding user, regardless of the status of access. In the illustrated example, finding the user "S-1" in the black list 120 causes the interception of all accesses from access IDs [3] and [6].

Figures 3B, 4:
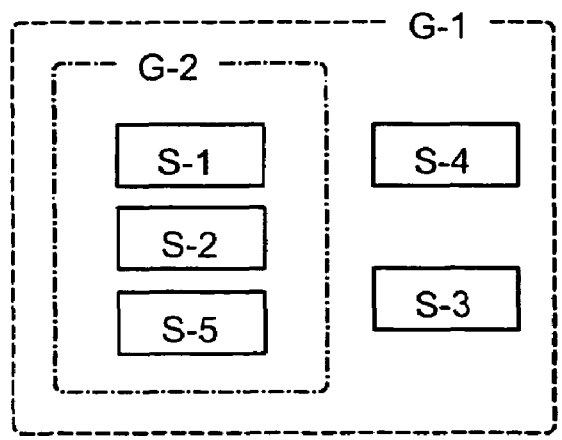

FIG. 3A is a schematics that shows an exemplar of the ACL. The ACL 110 includes information such as: unique ID of each access right, object's name, name of the user managing the object, permitted group, and permission of the access right. FIG. 3B shows general concept of the group. A group "G-1" in the dotted box includes users "S-1", "S-2", "S-3", "S-4", and "S-5." And a group "G-2" in the chained box is a part of the group "G-1" and includes users "S-1", "S-2", and "S-5." Accordingly, the users "S-1", "S-2", and "S-5" belong to both groups "G-1" and "G-2."

Respective characters, "R" and "W" in the "permission" represent "Read" or readable and "Write" or writable. Concretely, the object [O-1] in the ID [1] is permitted "R, W", which means the object is both readable and writable by the user "S-3". Similarly, the object [O-1] in the ID [2] is permitted "R", which means the object is further readable by users in the group "G-1."

FIG. 4 is a schematic that shows an exemplar of the black list. The black list 120 includes user information, such as user ID and user name. Alternatively, either the user ID or the user name may be omitted. In FIG. 4, the user information, the user ID "S-1" and the user name "Taro Hitachi", is recorded in the black list 120, which is recorded by the access controller 100 in response to an access interception requirement. The black list 120 can contain a plurality of users at one time. And a new user to be subjected to the emergency access interception can be added to the black list.

Other access controllers 200, 300, and 400 have similar configuration, and the explanation for them is omitted.

A3. Access Control Process

Figure 5:
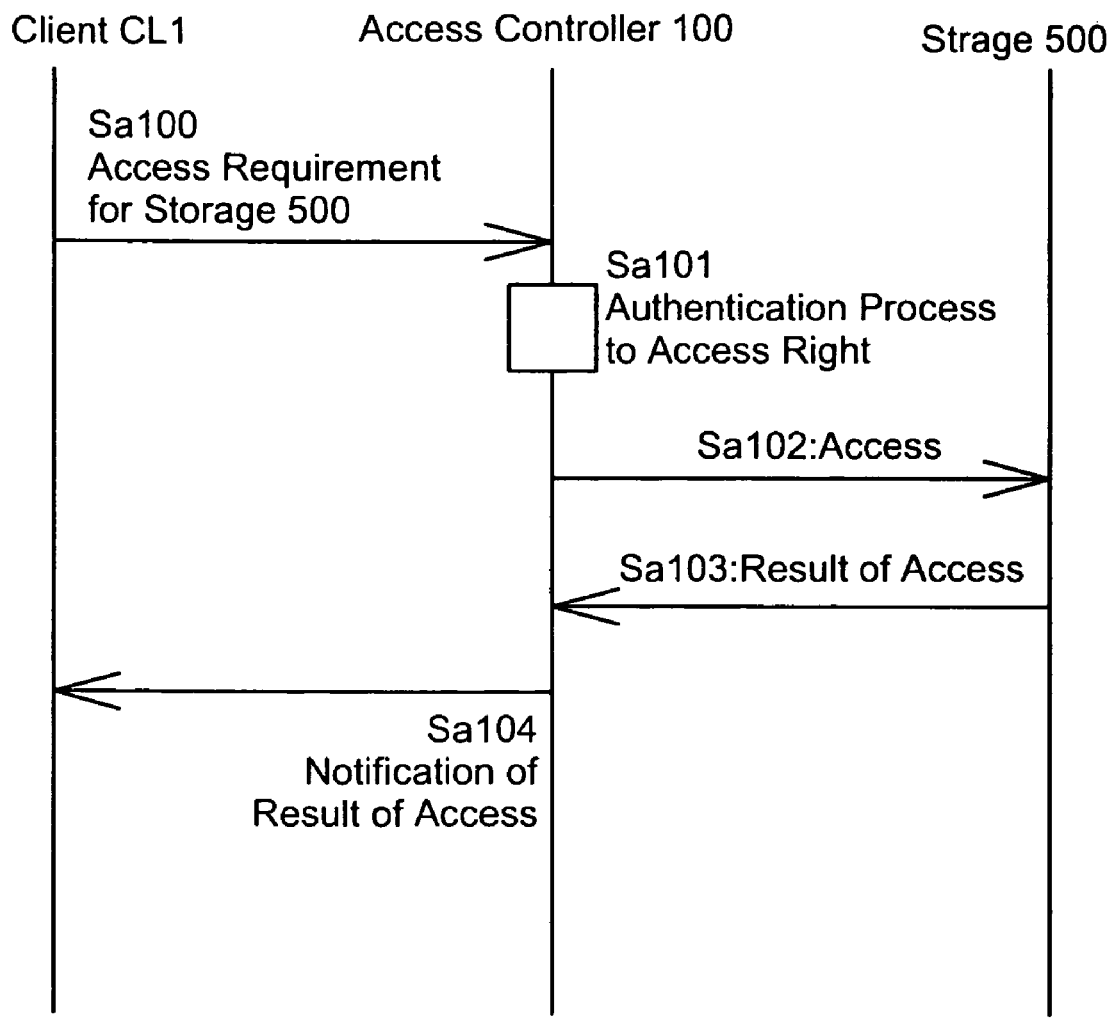
FIG. 5 is a flowchart of the access control process.

FIG. 5 is a flowchart of the access control process, which enables the client CL1 to access the data file 501 in the storage device 500.

The client CL1 sends out an access requirement to the access controller 100 (step Sa100). The access controller 100 receives the requirement and authenticates the access right of the user by checking the black list 120 and the ACL 110. The access controller 100 accesses to the storage 500 according to the authentication result (step Sa102) and responses the access result to the client CL1 (step Sa103, Sa104).

Figure 6:
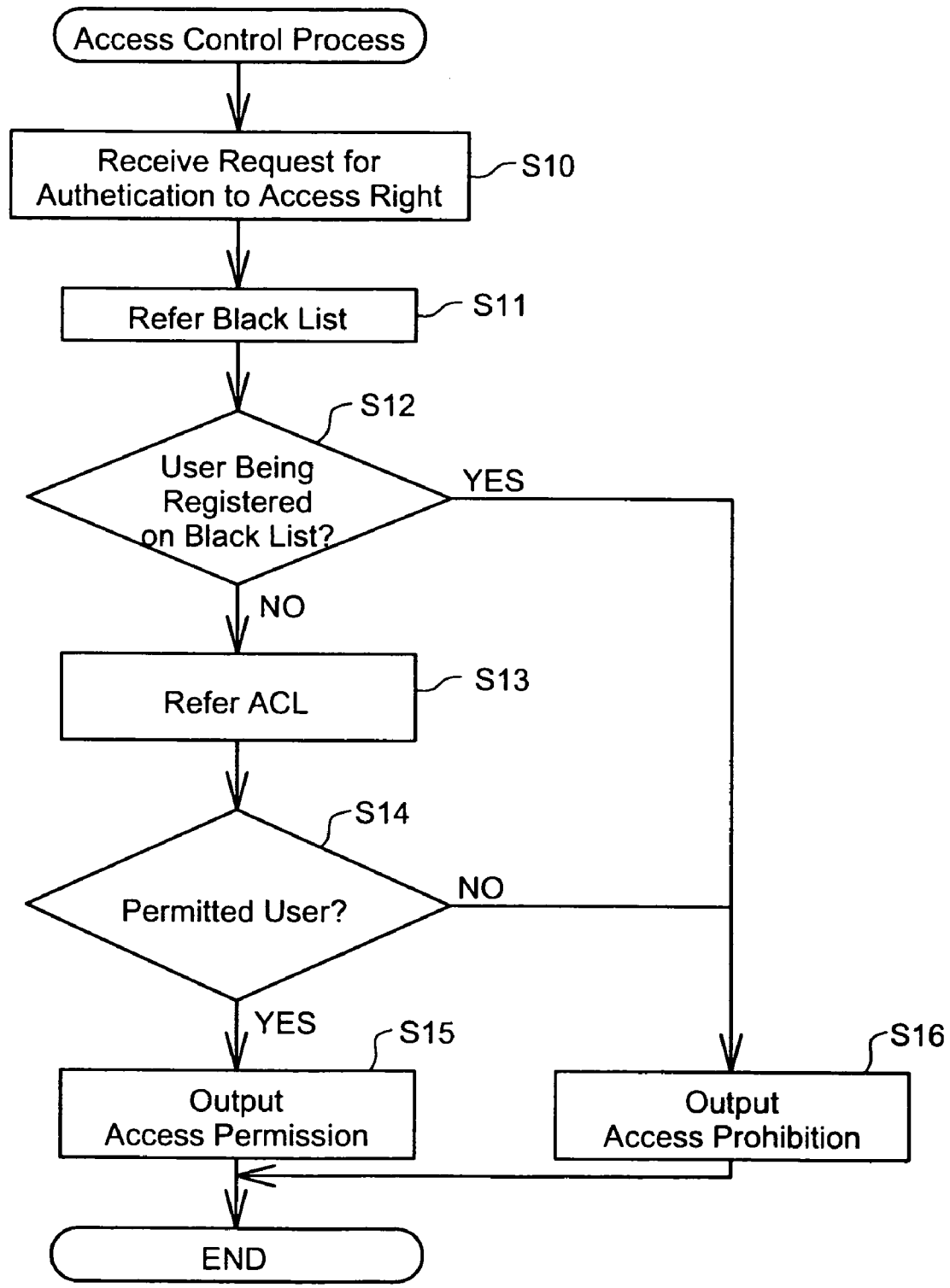
FIG. 6 is a flowchart of the access control process in the access controller.

FIG. 6 is a flowchart of the access control process in the access controller, which corresponds to step Sa101 in FIG. 5 and is executed by the access controller 100.

The access controller 100 receives the request for authentication of access right to the storage device 500 from the client CL1, and also receives user ID and access-required object's name (step S10). Then the access controller 100 checks the black list 120 (step S11) to judge whether or not the accessing user is registered in the list 120 (step S12). If registered, the access controller 100 sends out the storage device 500 an access prohibition notice (step S16) to intercept all accesses by the user.

If not registered, the access controller 100 then checks the ACL 110 to find the permission for the access-required object (step S13). If permitted (step S14), the access controller 100 accesses to the storage device 500 under the permission, such as readable and writable (step S15). If not permitted (step S14), though the user is out of the black list 120, the access controller 100 sends out the access prohibition notice to the storage device 500 (step S16).

A4. Black List Distribution Process

Figure 7:
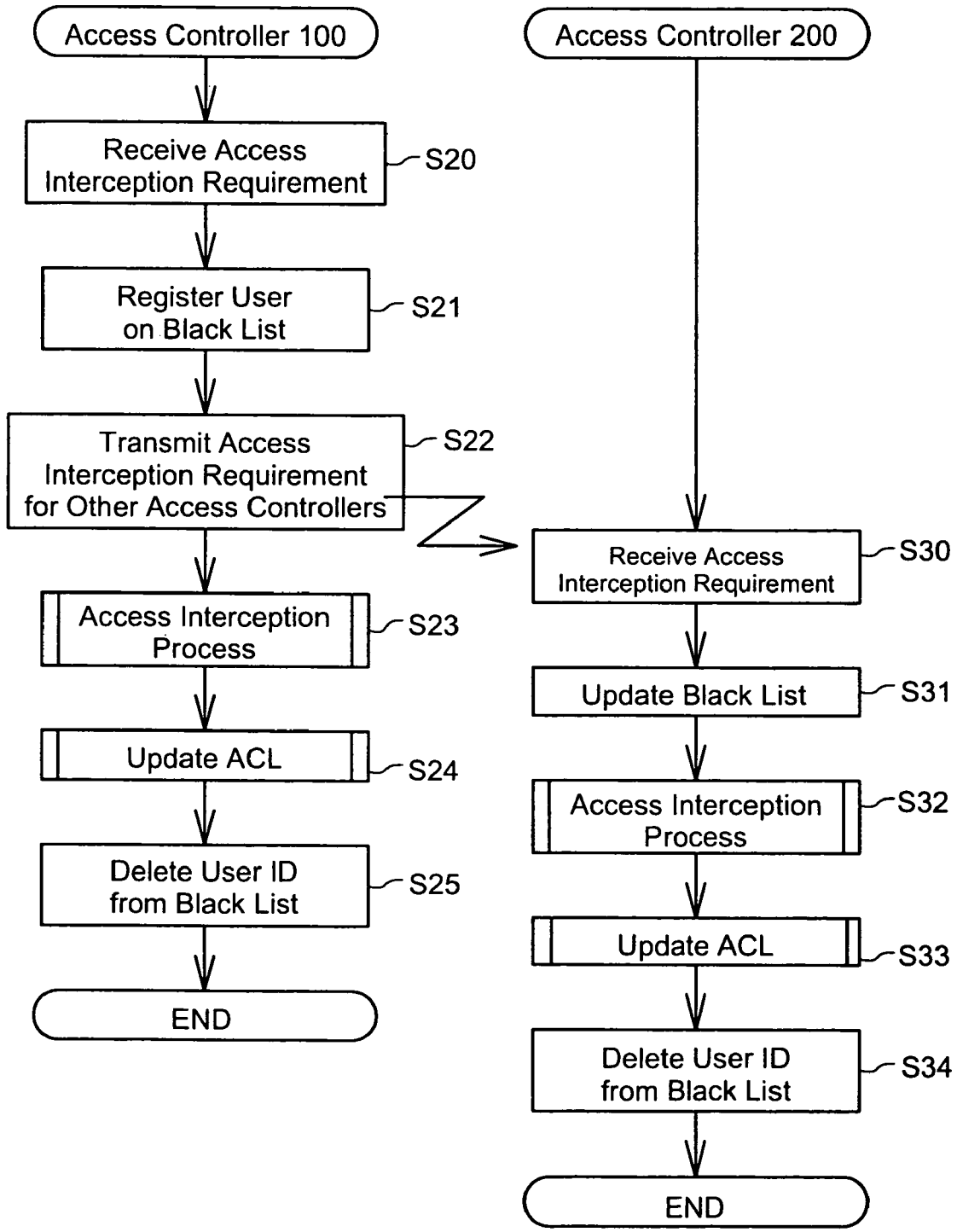
FIG. 7 is a flowchart of the black list distribution process.

FIG. 7 is a flowchart of the black list distribution process. When receiving input of the access interception requirement through the administrator's operation, the access controller 100 registers the user information that is subjected to be the access interception on own black list 120 and broadcasts the user information and registration instruction of the information to the access controllers 200, 300, 400. FIG. 7 exemplifies one case in which the access controller 100 transmits the instruction to the access controller 200.

According to the flowchart of FIG. 7, the access controller 100 inputs the access interception requirement through the administrator's operation (step S20) and registers the user information including user ID and user's name in the black list 120 (step S21). The access controller 100 then transmits the registration instruction and the user information to the access controller 200 as well as the access controller 300 and 400 to instruct each access controller to register the user information in its own black list (step S22).

Subsequently, the access controller 100 executes the access interception process to intercept any access by the user listed on the black list, as described below (step S23). The access controller 100 updates the ACL according to the black list (step S24), as described below, and deletes the user information from the black list 120 (step S25) after the updating.

The access controller 200 receives the registration instruction transmitted from the access controller 100 at step S22 and updates the black list 220 by adding the user information, user ID and user's name to the list 220 (step S31). The access controller 200 executes the access interception process according to the updated list 220 (step S32), updates the ACL (step S33), and deletes the user information from the black list 220 (step S34). The processes of steps S32-S34 are similar to those of steps S23-S25 in the access controller 100. The access interception process (step S23, step S32) and the process to update the ACL (step S24, step S33) are described below.

A5. Access Interception Process

Figure 8:
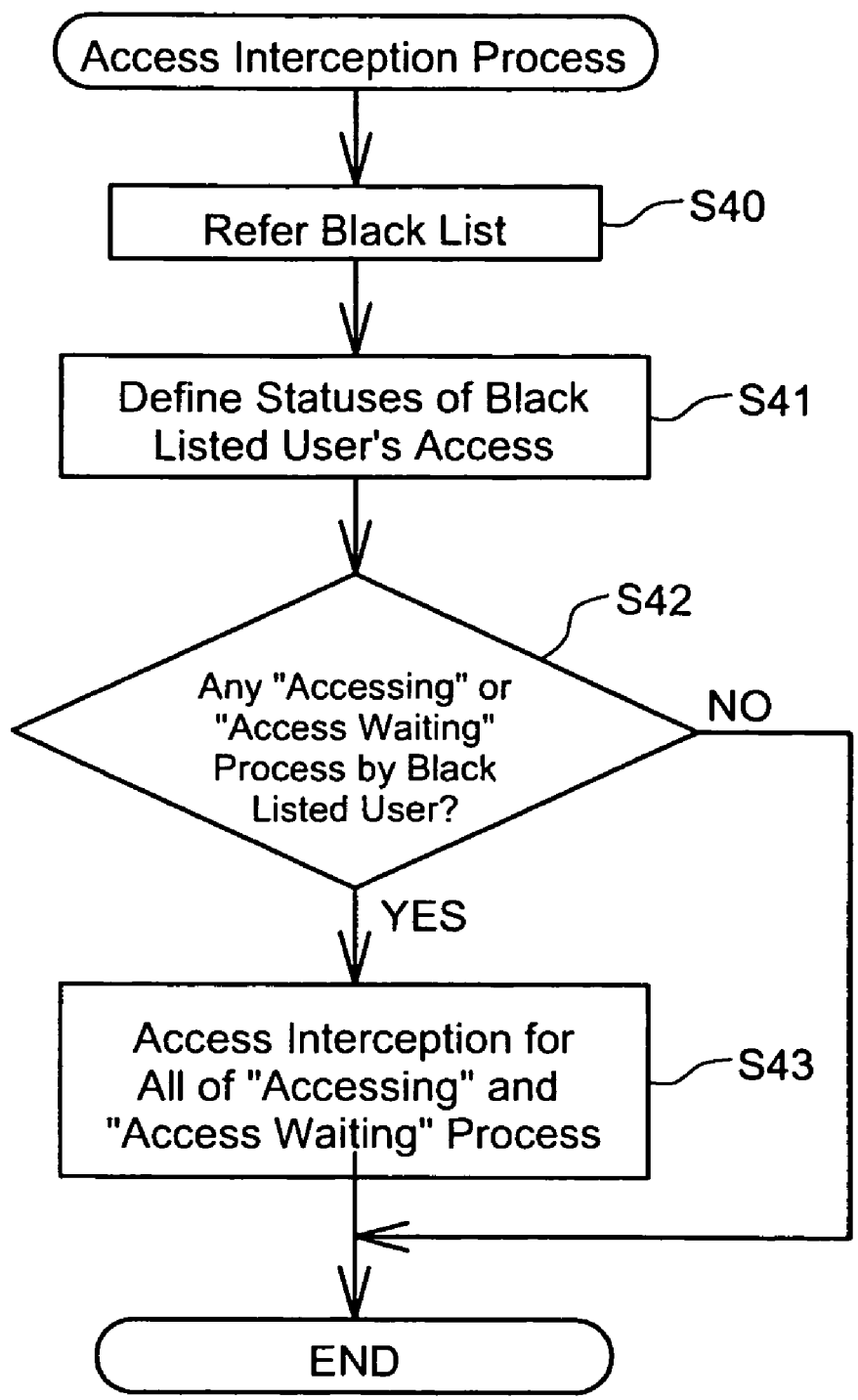
FIG. 8 is a flowchart of the access interception process.

FIG. 8 is a flowchart of the access interception process. This process corresponds to the processes of steps S23 and S32 in FIG. 7 and is executed by the access controllers 100 and 200.

The access controller 100 refers to the black list 120 and the access management table 109a (step S40, S41) to define statuses of accesses by black listed user, that is, to determine whether or not there is any black listed user's access in the status of "accessing" or "access waiting" (step S42). In the case where such an access is found, the access controller 100 intercepts all accesses by the black listed user regardless of the status, "accessing" or "access waiting" (step S43). On the other hand, in the case where no access by the black listed user is found, the access controller 100 returns from this process.

A6. ACL Update Process

Figure 9:
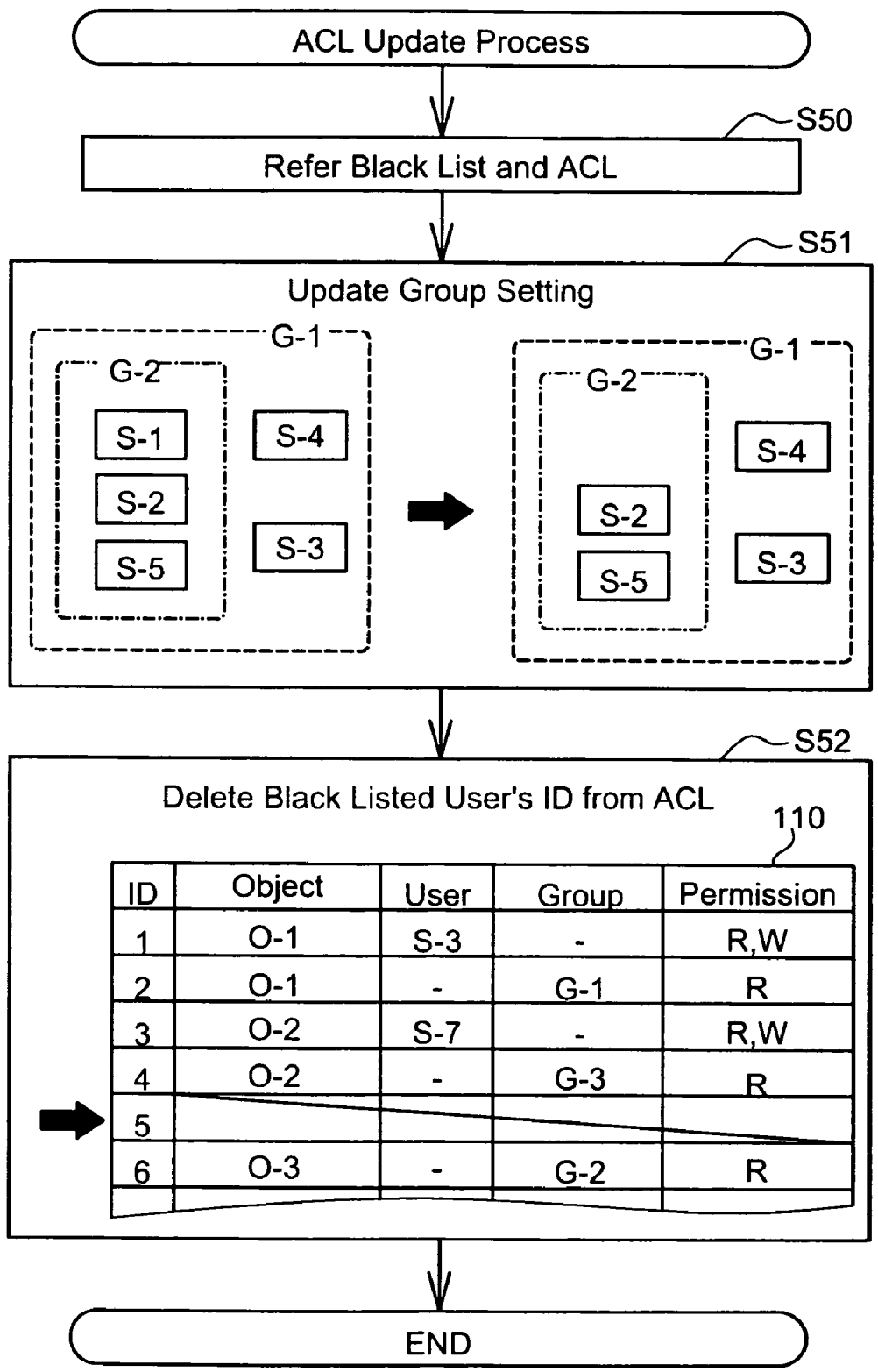
FIG. 9 is a flowchart of the ACL update process.

FIG. 9 is a flowchart of the ACL update process. This process corresponds to the process of steps S24 and S33 in FIG. 7 and is executed by the access controllers 100 and 200. The user with User ID "S-1" and user name "Taro Hitachi" is assumed to be a subject of the access interception.

The access controller 100 refers to the black list 120 and the ACL 110 (step S50) to delete the user ID "S-1" from a group, thereby updating the group setting (step S51). The access controller 100 subsequently retrieves all records with user ID "S-1" from the ACL 110 and deletes them (step S52). Concretely, the record ID [5] is shown to be deleted in the FIG. 7.

This process enables the ACL 110 relating to the user ID "S-1" to be updated with the group setting kept.

The embodiment described above can response situations where access right of some users must be prohibited without delay, and can transmit the user information of such users to all access controllers under the widely distributed environment. Each access controller can enhance securities by utilizing the black list prior to the ACL, because updating the ACL needs longer time and is suitable for an emergency access interception.

B. Modifications

This invention is not limited to the above embodiment but there may be various modifications within the spirit thereof.

B1. First Modification

Unlike the embodiment in which the access controller 100 transmits the user information and the registration instruction to all other access controllers, the access controller 100 may transmit the updated black list in place of the information. This ensures effective updating of the black list in the other access controllers.

Figure 10:
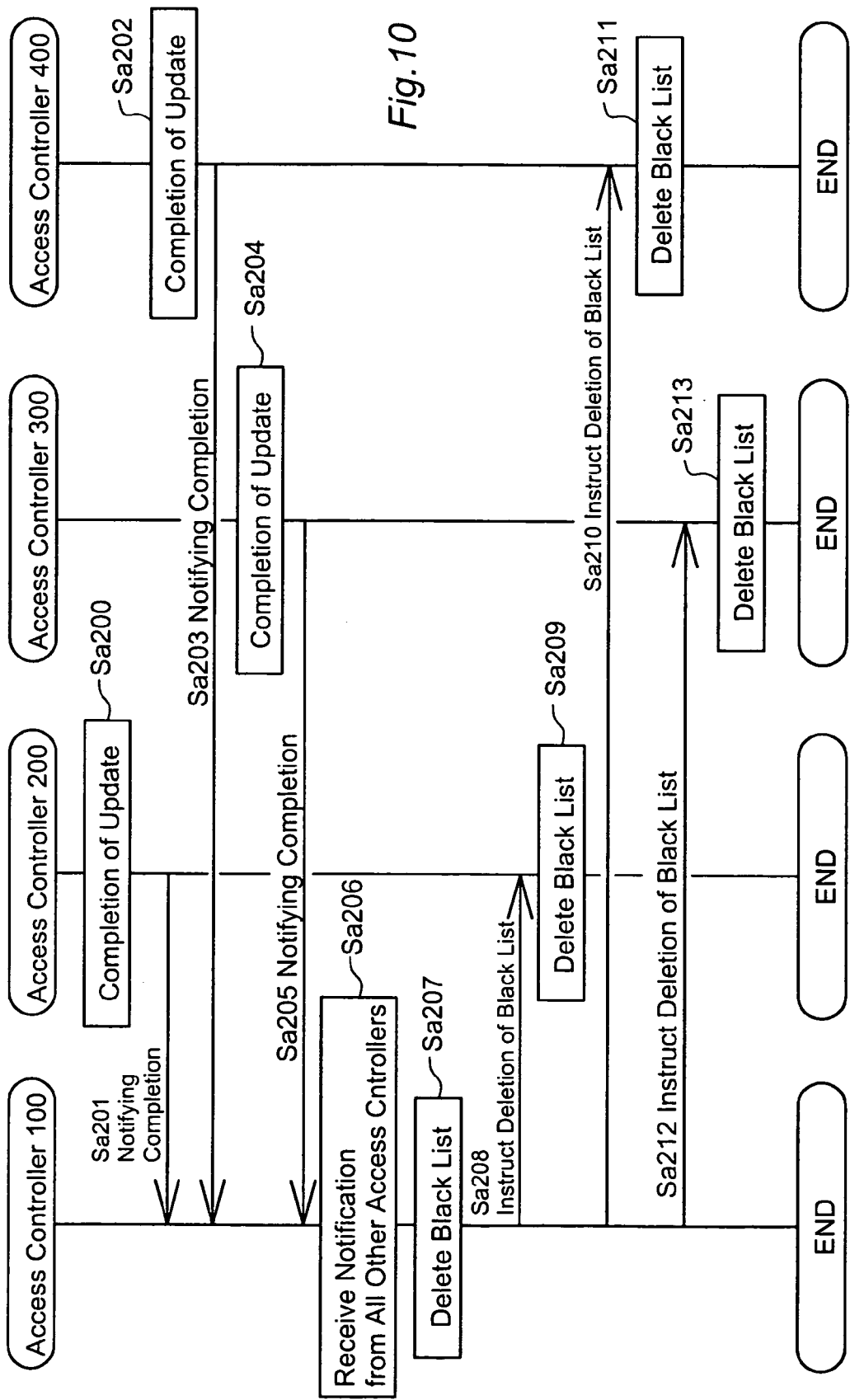
FIG. 10 is a flowchart of process for deleting the black list.

Unlike the embodiment in which the access controller deletes the user information from the black list after updating the ACL, the access controller may delete the old black list in response to receipt of the updated black list. FIG. 10 is a flowchart of process for deleting the black list. The updating of the ACL is assumed to be completed before the process.

According to the process of FIG. 10, the completion of updating the ACL (step Sa200) causes the access controller 200 to notify the access controller 100 of the completion to the distributor of the black list, (step Sa201). Similarly, the access controllers 300 and 400 notify the completion (step Sa202-step Sa205).

After receiving the notification from all other access controllers, the access controller 100 deletes own black list (step Sa207) and instruct other access controllers to delete their black lists. In response to this instruction, the access controllers 200, 300, and 400 delete their own black lists (steps Sa208-Sa213).

This modification ensures the synchronization of the ACL in all access controllers. This modification ensures reflection of all user information in the black list to the ACL, even when a plurality of access interception requirements are submitted in s short period and causes frequent updates of the black list.

B2. Second Modification

Figure 11:
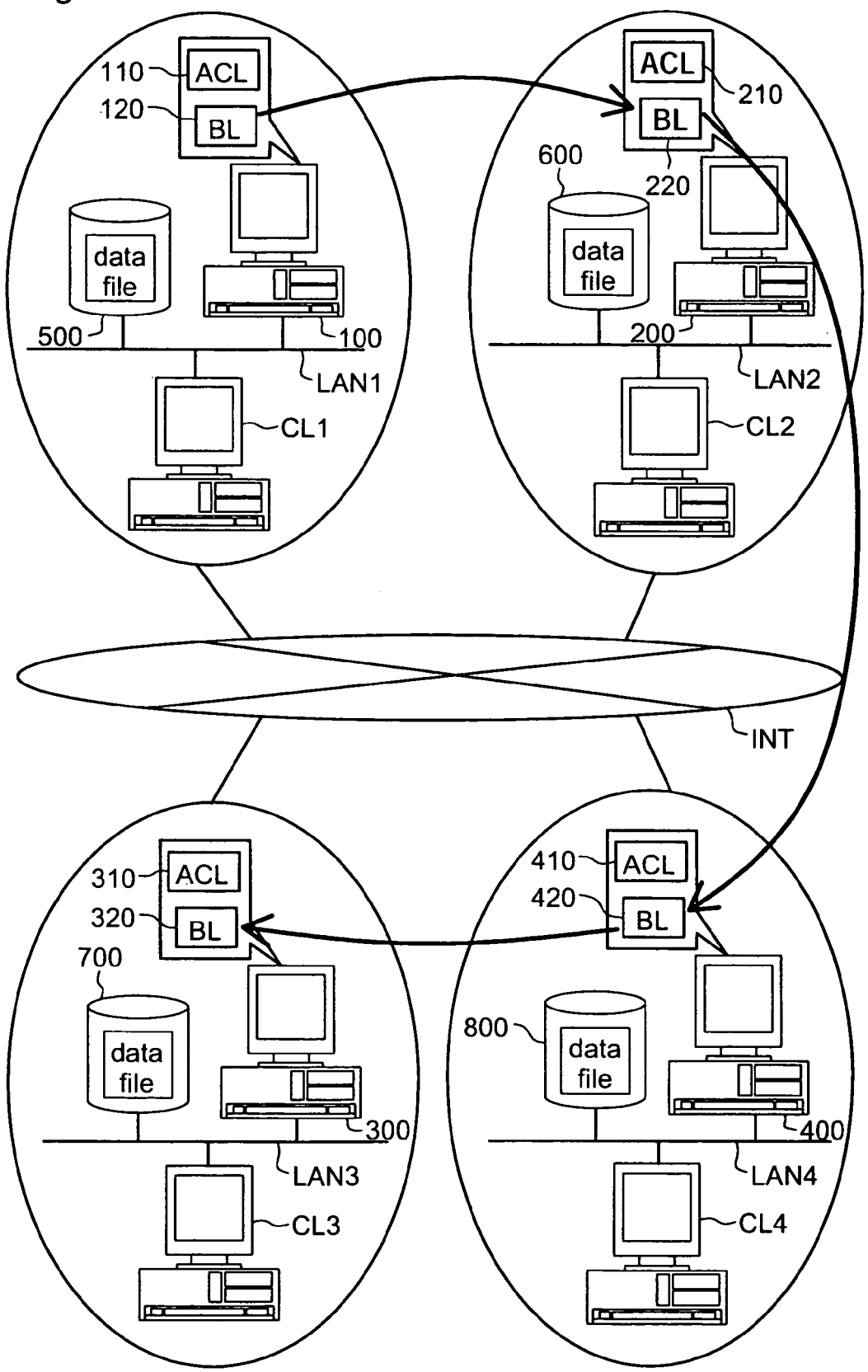
FIG. 11 is a schematic that shows a modified system configuration.

Unlike the embodiment in which the access controller 100 simultaneously transmits the updated black list to all other access controllers 200, 300 and 400, the access controller may transmit the list to one of the other access controllers as shown in FIG. 11. The receiving controller can transmit the list to another. As illustrated with bold arrows in FIG. 11, the access controller 100 transmits the black list to the access controller 200, the controller 200 to the controller 300, and the controller 300 to the controller 400. The destination of the transmission can be selected in consideration of the number of hopping on the networks, and thus enhances efficiency of the transmission.

B3. Third Modification

The embodiment can apply a certificate authority that manages certifications of proper users under widely distributed environment. In this system, the certificate authority may execute the access control with the black list prior to authenticate the certification, which ensures securities.

What is claimed is:

1. An access control system in which a plurality of storage devices for storing information resources and access controllers for controlling accesses to the information resources stored in the storage devices are connected with a network, each of the access controllers having an access control list on which access right to each information resource stored in the storage devices is recorded, and each of the access controllers having an access prohibition list on which user information of access prohibited users are recorded who are prohibited from accessing any information resource stored in the storage devices, each access controller comprising:

- an access restriction module configured to restrict access to each information resource stored in a storage device and listed on the access control list of the access controller that records access right to each information resource;
- an access interception module configured to intercept the access by reference to the access prohibition list of the access controller, which records user information of access prohibited users, prior to referencing the access control list by the access restriction module;
- a list update module configured to update the access prohibition list;
- an access control list update module configured to update the access control list according to the updated access prohibition list; and
- a distribution module;

wherein the distribution module of at least one of the access controllers having received user information to be added to the access prohibition list thereof, and an access prohibition list updated accordingly, is configured to send out the user information added to the updated access prohibition or the entire updated access prohibition list to the other access controllers in response to the access prohibition list of the sending access controller being updated;

wherein the list update module of each of the other access controllers is configured to receive the sent-out user information or updated access prohibition list, and to update the access prohibition list thereof to include the received user information or updated access prohibition list, wherein after the list update module of each of the other access controllers updates the access prohibition list thereof, the access control list update module thereof updates the access control list thereof according to the updated access prohibition list thereof, removing access rights from the access control list for any user corresponding to the user information in the updated access prohibition list;

wherein after completing the updating of the access control list thereof, each of the other access controllers deletes the received user information from its updated access prohibition list or the entire updated prohibition list, and notifies the sending access controller of said completion; and wherein the list update module of the sending access controller deletes the user information on its access-prohibited list or the entire access prohibition list thereof at a predetermined timing after receiving the completion notifications from the other access controllers.

2. An access control system according to claim 1, wherein the sending access controller is configured to send an instruction to each of the other access controllers for deleting the user information or updated access prohibition list sent thereto, said instruction being sent by the sending access controller to each of the other access controllers after receiving said notification of completion therefrom.

3. An access control system according to claim 2, wherein each of the access controllers manages a different respective information resource on the basis of at least one of the access control list and the access prohibition list in the access controller to control accesses from a client computer with user information.

4. An access control system according to claim 2, wherein each of the access controllers manages information resources in a different respective first network, and each of the first networks is coupled to a second network.

5. An access control system according to claim 1, wherein the sending access controller further comprises a storage manager including an access management table on which status of accesses to the information resources stored in the storage devices is reported with a correspondence to the accessing user thereof, wherein the access interception module intercepts any access, appearing in the access management table, by a user whose user information is on the access prohibition list.

* * * * *